United States Patent Office 3,782,975
Patented Jan. 1, 1974

3,782,975
METHOD OF PRODUCING CURED LOW SODIUM MEAT PRODUCTS
Thadeus B. Zyss, Highland, Calif., assignor of a fractional part interest to Milo Don Appleman, Jr., Los Angeles, Calif.
No Drawing. Continuation-in-part of abandoned application Ser. No. 869,370, Oct. 24, 1969. This application Oct. 1, 1971, Ser. No. 185,896
Int. Cl. A22c 18/00; A23b 1/02; A23l 3/34
U.S. Cl. 426—281                                      14 Claims

ABSTRACT OF THE DISCLOSURE

A method is provided for curing fresh primal cuts of meat intended for consumption by those on a low sodium diet which includes the step of subjecting a fresh primal cut to an aqueous curing solution substantially free of sodium and chloride ions and containing about 1.0 to 20% by weight of a water soluble, non-toxic phosphate composition selected from the group consisting of orthophosphate, polyphosphate and pyrophosphate salts of potassium and mixtures thereof.

CROSS REFERENCE TO RELATED APPLICATION

This application is a continuation-in-part of U.S. patent application No. 869,370 filed on Oct. 24, 1969 and entitled "Salt-Free Process Meats and Method for Making Same, now abandoned.

BACKGROUND OF THE INVENTION

This invention relates to the curing of fresh primal cuts of meat and more particularly, to the use of potassium phosphates as a substitute for sodium chloride and sodium phosphates in the injection curing of primal cuts intended for consumption by those on a low sodium diet.

The term "primal cuts" as used herein refers to ham, bacon, corned beef and pastrami.

In the curing of primal cuts by the injection process, the meat is pumped to about 110% of its weight with an aqueous curing solution which, typically, contains sodium chloride, sodium nitrite and/or nitrate, sugar and/ or honey, sodium phosphate, sodium ascorbate and condiments.

Bacon, corned beef and pastrami are injected with the curing solution by a procedure known as stitch pumping in which the solution is pumped directly into the tissues through a large number of closely spaced, hollow needles.

Arterial pumping is used to inject the curing solution into ham, although a procedure similar to stitch pumping could also be employed. In arterial pumping, the solution is injected into the vascular system of the ham through a hollow needle inserted in, for example, the femoral artery. The curing solution is carried through all of the capillaries and establishes equilibrium with the tissue cells. Since ham shrinks about 10% by weight during the heating and smoking steps of the curing process, the curing solution is pumped into ham in an amount corresponding to about 10% of its "green weight" or raw weight. If the curing solution is added to ham in an amount corresponding to 10–15% of its green weight, the ham is labelled "water added"; and if the curing solution is added in an amount from 15 to 20% or more of its green weight, the product is labelled "imitation ham."

After the pumping step, the primal cuts are maintained at a temperature usually between 32° to 42° F. for about 3 to 5 days. During this period, the sodium nitrite reacts with the myoglobin of the meat to form a permanent nitrosomyoglobin. Sodium nitrate is a source for additional nitrite ion. Following the cooling steps, the primal cuts may be further processed by heating and smoking. The resulting cured meats are refrigerated until sold or processed into canned products.

The addition of the aqueous curing solution to the primal cuts imparts improved texture and tenderness to the meat structure which would otherwise be lacking if the brine was not added to the meat. In order for the added water to be retained, it is necessary to have ingredients in the brine which assure good hydration and binding of the water with the meat.

In the past, there has been debate in the art as to whether the sodium ion or the chloride ion was the essential ion in the binding of water with meat where phosphates were present. In this connection, the compositions of the prior art used in curing hams as well as compositions used in the preparation of sausage-type products contained sodium and/or chloride ions.

Although most people can readily injest primal cuts cured with a conventional sodium chloride/sodium phosphate brine, there are certain individuals, particularly those with heart disease and related ailments, who require a low sodium diet. These persons have relatively little variety in their diet because of the small number of low sodium foods. Additionally, other people who could benefit from a low sodium diet, but who do not suffer severely from sodium chloride containing foods, usually do not stay on the prescribed or recommended diet because of the poor selection of low sodium foods. Thus, the production of low sodium primal cuts would be of substantial benefit to those persons who are on a restricted diet because it would increase the variety of "tasty" foods available for their selection and consumption.

PRIOR ART

It is known in the prior art that the moisture retention of cured primal cuts can be enhanced by curing the primal cuts with a sodium chloride curing brine containing phosphate salts.

U.S. Pat. No. 2,937,094 (Rupp et al., 1960) discloses an aqueous curing solution for hams containing sodium chloride, sodium or potassium nitrite and nitrate, a phosphate mixture of, for example, tetrasodium (or potassium) pyrophosphate and monosodium (or potassium) orthophosphate, sugar and spices.

U.S. Pat. No. 3,401,046 (Mahon, 1968) is directed to the preparation of physically joined crystals of sodium (or potassium) tripolyphosphate, sodium nitrite and/or sodium nitrate and sodium hydroxide. A curing solution for arterial pumping of hams to about 120% of their weight was prepared by dissolving the crystalline material and salt in water in specified amounts.

It is also disclosed in the prior art, as set forth in U.S. Pat. No. 3,104,170 (Mahon, 1963), that moisture retention of poultry on storage and cooking can be enhanced by initially dipping the poultry in a chilled solution containing sodium chloride and a phosphate salt such as sodium (or potassium) tripolyphosphate.

The use of potassium chloride and potassium phosphates in the preparation of dietetic sausages has also been described in the prior art.

In U.S. Pat. No. 3,447,932 (Olson et al., 1969) it is disclosed that potassium polyphosphates and potassium pyrophosphates can be used in conjunction with limited amounts of potassium chloride as a substitue for sodium chloride in the manufacture of dietetic sausage and meat loaf products.

The patentees point out that in the manufacture of sausage products, sodium chloride is generally considered to be an essential ingredient for the reason that such products require a meat protein solubilizing agent (NaCl) so that on cooking, the ground particles have sufficient coherence to provide a product of suitable texture.

Olson et al. note that while potassium chloride also functions as a meat protein solubilizing agent and is not harmful to individuals on a low sodium diet, it is not satisfactory in that concentrations which are capable of providing sufficient meat particle coherence impart a bitter and unpalatable taste to these products.

The patentees found that potassium salts of polyphosphates and pyrophosphates can be cooperatively combined with low concentrations of potassium chloride to solubilize meat proteins and produce sodium salt-free sausage and meat loaf of satisfactory texture and taste.

Thus, the aforesaid prior art compositions used in the curing of hams, processing of poultry and preparation of dietetic sausage products contained either the sodium ion and/or the chloride ion.

SUMMARY OF THE INVENTION

In accordance with this invention, a method is provided for curing fresh primal cuts of meat which does not require the presence of either the sodium ion or the chloride ion and which includes the step of subjecting a fresh primal cut to an aqueous curing solution containing about 1.0 to 20% by weight of a water soluble, non-toxic phosphate composition selected from the group consisting of orthophosphate, polyphosphate and pyrophosphate salts of potassium and mixtures thereof. The curing solution is free of sodium and chloride ions except for the nominal amount present in commercial water supplies used in making up the solution and, typically, is further formulated with special purpose additives such as potassium nitrite, potassium nitrate, sugar, potassium ascorbate and condiments. The curing solution has a pH from about 6 to 8 and is added to the primal cuts in an amount corresponding to about 5 to 20% of their weight.

DETAILED DESCRIPTION

The curing solutions used in the method of this invention are prepared by dissolving the potassium phosphate composition and sodium free additives in water. The potassium phosphates employed herein include potassium orthophosphates, potassium polyphosphates, potassium pyrophosphates and mixtures thereof in their anhydrous and hydrated forms. Specific examples of potassium phosphates which can be used in practicing the invention are as follows.

(I) Potassium orthophosphates:
  $KH_2PO_4$
  $K_2HPO_4$
  $K_3PO_4$
  $K_2AlPO_4$ (under orthophosphates, for classification)
  $K_2HPO_4 \cdot 2H_2O$ (II) Potassium polyphosphates:
  $K_5P_3O_{10}$ (III) Potassium pyrophosphates:
  $K_4P_2O_7$ Although the chemistry of phosphates is fairly complex, many water-soluble phosphates are well known. See, for example, the section on phosphates starting at p. 232, vol. 15, of the Encyclopedia of Chemical Technology, 2nd ed., Kirk and Othmer.

The concentration of the potassium phosphate composition in the aqueous curing solution is generally in the range of about 1 to 20% by weight and, preferably, in the range of about 4 to 12.5% by weight. When the primal cuts are pumped to about 110% of their weight with a curing solution containing about 1 to 20% by weight of phosphate, then the retained phosphate in the primal cut will be in the range of about 0.1 to 2.0% by weight and when the primal cuts are pumped to 110% of their weight with a solution containing 4 to 12.5% by weight of phosphate, then the retained phosphate will be in the range of about 0.4 to 1.25% by weight.

It has been found that particularly good results with respect to shelf life are obtained when the phosphate composition is a mixture of $KH_2PO_4$ and $K_2HPO_4$. The mixture generally contains about 25 to 75 parts by weight of $KH_2PO_4$ and 75 to 25 parts by weight of $K_2HPO_4$. A preferred phosphate mixture contains about equal parts by weight of $KH_2PO_4$ and $K_2HPO_4$.

In the laboratory, fresh primal cuts of ham, bacon, corned beef and pastrami, weighing about 454 grams each, were injected with aqueous curing solutions consisting of potassium phosphate salts dissolved in distilled water and cured in the usual manner. The curing solutions were injected into the primal cuts in amounts corresponding to 10 to 30% of their weight and it was noted, upon completion of the curing process, that the added water was effectively bound to the meat.

The laboratory experiments demonstrated that water retention of the cured primal cuts was significant when the potassium phosphate level of the primal cuts was 0.1% by weight and that increased water binding or retention occurred up to a retained phosphate level of 1.25% by weight. The amount of water binding was substantially constant at a retained phosphate level from 1.25 to 2.0% by weight. It should be noted that at a retained phosphate level in the primal cut of 1.25% by weight the product will produce thirst in almost all users as well as a phosphate taste. However, the present legal limit for phosphates is such that the potassium phosphate composition is added to primal cuts to the level of 0.5% by weight.

Potassium nitrite and/or potassium nitrate are advantageously included in the curing solution in an amount from about 0.05 to 0.2% by weight. Potassium nitrite reacts with the myoglobin of the meat to produce the cured meat color. Potassium nitrate serves as a reservoir in the curing solution for additional nitrite ions. The present legal limit for nitrite is 2 pounds per 100 gallons of curing solution and the completely processed primal cuts may not contain more than 200 parts of nitrite per million parts of meat.

Sugar and/or honey may be included in the curing solution in an amount from about 1 to 8% by weight to impart a delicate taste to the cured product. The amount of sugar used is not critical but it relieves the bland taste and covers the phosphate which becomes noticeable for some individuals at the 0.7 to 0.8 percent retained phosphate level and above.

Isoascorbic acid or potassium erythorbate can also be added to the curing solution in an amount up to 0.5% by weight to reduce any metmyoglobin to myoglobin. The legal limit for this ingredient is 75 ounces per 100 gallons of curing solution.

The curing solution, which is usually at ambient temperature, is injected into hams by arterial pumping and into bacon, corned beef and pastrami by stitch pumping in an amount corresponding to about 5 to 20% of the weight of the primal cuts. The primal cuts during the pumping step are at a temperature between about 33° and 100° F. Following the pumping step, the primal cuts are refrigerated for several days and then further processed by heating or heating and smoking in accordance with procedures well known in the art.

EXAMPLES

The following examples further illustrate the method of the invention.

Example I

An aqueous curing solution was prepared having the following composition.

| Ingredients: | Quantity |
|---|---|
| Water | gal__ 55 |
| Sugar | labs__ 25 |
| $KNO_2$ | oz__ 10 |
| $KNO_3$ | oz__ 10 |
| Isoascorbic acid | oz__ 11 |
| $K_2HPO_4$ | lbs__ 4.5 |
| $KH_2PO_4$ | lbs__ 4.5 |

Two hams weighing about 10 pounds each, a side of bacon, a round and a brisket for corned beef and a boned out shoulder for pastrami were pumped with the curing solution to 110% of their green weight, the present legal limit for added moisture. The hams were injected with the solution by arterial pumping and the other primal cuts were injected with the solution by stitch pumping. After pumping step, the primal cuts were refrigerated at 40° F. for 3 days.

Following refrigeration, the primal cuts were further processed by heating or heating and smoking. The hams were heated at 130° F. for 4 hours without smoking after which one ham was heated at 140° F. for 8 hours with heavy smoking and the other ham was heated at 165° F. for 10 hours without smoking. The bacon slab was smoked at approximately 135° F. for about 10 hours at which time the internal temperature had reached 128° F. In the case of pastrami, the primal cut was hung in the smokehouse and rubbed with a pastrami spice mixture in which no sodium chloride was present. The temperature was elevated in stages, with smoking to 125° F., 150° F. and 180° F. in accordance with the usual procedure. Corned beef was further processed by heating it in a steam oven.

The hams, which had a green weight of 10 pounds each, were pumped with 1 pound of curing solution to provide a total weight of 11 pounds each. After processing was completed, the ham which was heated at 140° F. with heavy smoking weighed 9.7 pounds while the ham which was heated at 165° F. without smoking weighed 9.4 pounds. Two control hams which were processed without potassium phosphate weighed 9.1 and 9.0 pounds. Thus, the control hams lost more weight than the hams cured with potassium phosphate and the texture of the control hams was somewhat tougher and drier. Like results with respect to water retention were obtained for the other primal cuts pumped with the potassium phosphate curing solution.

Example II

Curing solutions were prepared having the following compositions:

| Composition | Quantity | | |
|---|---|---|---|
| | A | B | C |
| Ingredients: | | | |
| Water | 55 gallons | 55 gallons | 55 gallons. |
| Sugar | 25 pounds | 25 pounds | 25 pounds. |
| $KNO_2$ | 10 ounces | 10 ounces | 10 ounces. |
| $KNO_3$ | do | do | Do. |
| Isoascorbic acid | 41 ounces | 41 ounces | 41 ounces. |
| $K_2HPO_4$ | 9.0 pounds | 18 pounds | 38.75 pounds. |
| $KH_2PO_4$ | do | do | Do. |

Primal cuts corresponding to those identified in Example I were separately pumped to 110% of their green weight with composition A, composition B and composition C. The pumping procedure and further processing of the pumped primal cuts were the same as in Example I.

The weights of the cured meats pumped with composition A containing 9 pounds of $K_2HPO_4$ and 9 pounds of $KH_2PO_4$ were substantially equal to the green weights of the primal cuts while the weights of the cured meats pumped with composition B containing 18 pounds each of $K_2HPO_4$ and $KH_2PO_4$ were somewhat above the green weights of the primal cuts. The primal cuts pumped with compositions A or B had excellent texture, a bland flavor and no trace of bitterness.

The taste of the primal cuts pumped with composition C containing 38.75 pounds each of $K_2HPO_4$ and $KH_2PO_4$ was sharper and drier than the primal cuts processed with lower levels of phosphate. Also, there was a certain production of thirst in those sampling the meat products cured with composition C. By increasing the sugar and honey levels, the sharper phosphate taste could be covered in part and this could also be done by using more spice.

In one other sample pumped experimentally with composition C, water was retained to the 30% level but this was done by pumping on successive days in the chill room and the resulting product would have to be labelled "imitation."

Example III

This example illustrates the use of (a) potassium tripolyphosphate, (b) a mixture of tetrapotassium pyrophosphate and potassium aluminum orthophosphate, and (c) a mixture of potassium tetrametaphosphate and dipotassium orthophosphate in the preparation of low sodium, cured primal cuts.

Curing solutions were prepared having the following compositions.

| Composition | Quantity | |
|---|---|---|
| | A | B |
| Ingredients: | | |
| Water | 55 gallons | 55 gallons. |
| Sugar | 25 pounds | 25 pounds. |
| $KNO_2$ | 10 ounces | 10 ounces. |
| K erythorbate | 41 ounces | 41 ounces. |
| $K_5P_3O_{10}$ | 9.0 pounds | |
| $K_4P_2O_7$ | | 4.5 pounds. |
| $KAlPO_4$ | | Do. |
| $K_2HPO_4$ | | |

Primal cuts corresponding to those identified in Example I were separately pumped to 110% of their green weight with compositions A and B. The pumping procedure and processing were the same as in Example I.

It was noted in each instance that the cured ham, bacon, corned beef and pastrami had excellent characteristics with respect to water retention, texture and taste.

Having thus provided a written description of the invention, it should be understood that no undue limitations are to be imposed by reason of the specific examples but that the present invention is defined by the appended claims.

What is claimed is:

1. In a method for curing fresh primal cuts of meat intended for consumption by those on a low sodium diet which does not require the presence of either the sodium ion or the chloride ion, the step which consists of:
   injecting an aqueous curing solution into a fresh primal cut in an amount corresponding to about 5.0 to 20% of the weight of said primal cut,
   said curing solution being free of sodium and chloride ions except for the nominal amount present in commercial water supplies used in making up the solution and containing, as the water binding and retention agent, about 1.0 to 20% by weight of a water soluble, non-toxic phosphate composition selected from the group consisting of orthophosphate, polyphosphate and pyrophosphate salts of potassium and mixtures thereof.

2. A method according to claim 1 wherein the aqueous curing solution also contains about 0.05 to 0.2% by weight of a composition selected from the group consisting of nitrite and nitrate salts of potassium and mixtures thereof.

3. A method according to claim 2 wherein the aqueous curing solution also contains about 1 to 8% by weight of sugar.

4. A method according to claim 3 wherein the aqueous curing solution has a pH from about 6 to 8.

5. A method according to claim 4 wherein the temperature of the primal cut is from about 33° to 100° F.

6. A method according to claim 1 wherein the phosphate composition is potassium pyrophosphate.

7. A method according to claim 1 wherein the phosphate composition is potassium tripolyphosphate.

8. A method according to claim 1 wherein the phosphate composition is potassium orthphosphate.

9. A method according to claim 1 wherein the phosphate composition is a mixture of about 25 to 75 parts by weight of monopotassium dihydrogen orthophosphate and 75 to 25 parts by weight of dipotassium monohydrogen orthophosphate.

10. A method according to claim 1 wherein the phosphate composition is a mixture of about equal parts by weight of monopotassium dihydrogen orthophosphate and dipotassium monohydrogen orthophosphate.

11. In a method for curing fresh primal cuts of meat intended for consumption by those on a low sodium diet which does not require the presence of either the sodium ion or the chloride ion, the step which consists of subjecting a fresh primal cut to an aqueous curing solution having a pH from about 6 to 8 and containing about:

1.0 to 20% by weight of a water soluble, non-toxic phosphate composition selected from the group consisting of orthophosphate, polyphosphate and pyrophosphate salts of potassium and mixtures thereof as the water binding and retention agent, 0.05 to 0.2% by weight of a composition selected from the group consisting of nitrite and nitrate salts of potassium and mixtures thereof, and 1 to 8% by weight of sugar, said curing solution being free of sodium and chloride ions except for the nominal amount present in commercial water supplies used in making up the solution.

12. A method according to claim 11 wherein the potassium phosphate composition is a mixture of about 25 to 75 parts by weight of monopotassium dihydrogen orthophosphate and 75 to 25 parts by weight of dipotassium monohydrogen orthophosphate.

13. A method according to claim 11 wherein the potassium phosphate composition is a mixture of about equal parts by weight of monopotassium dihydrogen orthophosphate and dipotassium monohydrogen orthophosphate.

14. A method according to claim 11 wherein the quantity of the potassium phosphate in the aqueous curing solution is about 4 to 12.5% by weight.

References Cited

UNITED STATES PATENTS

| | | | |
|---|---|---|---|
| 3,029,150 | 4/1962 | Bickel | 99—222 |
| 2,513,094 | 6/1950 | Hall | 99—159 |
| 2,688,555 | 9/1954 | Komarik et al. | 99—159 |
| 3,076,713 | 2/1963 | Maas | 99—107 |
| 3,447,932 | 6/1969 | Olson et al. | 99—109 X |

OTHER REFERENCES

Rose et al.: "The Condensed Chemical Dictionary," 1956, 5th ed., published by Reinhold Publishing Corp., New York, p. 896, Potassium Metaphosphate.

HYMAN LORD, Primary Examiner

U.S. Cl. X.R.

426—332, 804